US012247183B2

(12) United States Patent
Vinson et al.

(10) Patent No.: US 12,247,183 B2
(45) **Date of Patent: *Mar. 11, 2025**

(54) WATER-SOLUBLE UNIT DOSE ARTICLE

(71) Applicant: The Procter & Gamble Company, Cincinnati, OH (US)

(72) Inventors: Phillip Kyle Vinson, Fairfield, OH (US); Vincent John Becks, Liberty, OH (US); Rebecca Ann Langevin, Norwood, OH (US); Mu Wang, Cincinnati, OH (US); Hilde Francoise Louise Andriessen, Mol (BE); Karel Jozef Maria Depoot, Anzegem Vichte (BE); Robby Renilde Francois Keuleers, Lippelo (BE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/390,735

(22) Filed: Dec. 20, 2023

(65) Prior Publication Data

US 2024/0117272 A1 Apr. 11, 2024

Related U.S. Application Data

(63) Continuation of application No. 17/339,004, filed on Jun. 4, 2021, now Pat. No. 11,891,587.

(60) Provisional application No. 63/035,124, filed on Jun. 5, 2020.

(51) Int. Cl.

| | |
|---|---|
| ***C11D 17/04*** | (2006.01) |
| ***C11D 1/14*** | (2006.01) |
| ***C11D 1/22*** | (2006.01) |
| ***C11D 1/29*** | (2006.01) |
| ***C11D 1/37*** | (2006.01) |
| ***C11D 1/83*** | (2006.01) |
| ***C11D 1/831*** | (2006.01) |
| ***C11D 1/94*** | (2006.01) |
| ***C11D 3/37*** | (2006.01) |
| *C11D 1/72* | (2006.01) |
| *C11D 1/75* | (2006.01) |

(52) U.S. Cl.
CPC .................. *C11D 1/37* (2013.01); *C11D 1/83* (2013.01); *C11D 1/831* (2013.01); *C11D 1/94* (2013.01); *C11D 3/3753* (2013.01); *C11D 17/043* (2013.01); *C11D 17/044* (2013.01); *C11D 1/146* (2013.01); *C11D 1/22* (2013.01); *C11D 1/29* (2013.01); *C11D 1/72* (2013.01); *C11D 1/75* (2013.01); *C11D 2111/12* (2024.01)

(58) Field of Classification Search
None
See application file for complete search history.

(56) References Cited

U.S. PATENT DOCUMENTS

| | | | |
|---|---|---|---|
| 3,480,556 | A | 11/1969 | Witt et al. |
| 4,441,881 | A | 4/1984 | Ruppert et al. |
| 6,060,443 | A | 5/2000 | Cripe |
| 6,228,829 | B1 | 5/2001 | Vinson et al. |
| 7,439,403 | B2 | 10/2008 | Hoelscher |
| 9,493,725 | B2 | 11/2016 | Vinson et al. |
| 9,493,726 | B2 | 11/2016 | Vinson et al. |
| 10,441,519 | B2 | 10/2019 | Zhao et al. |
| 11,807,829 | B2 | 11/2023 | Vinson |
| 11,891,587 | B2 | 2/2024 | Vinson |
| 2002/0022583 | A1 | 2/2002 | Buzzaccarini et al. |
| 2003/0216278 | A1 | 11/2003 | Depoot et al. |
| 2016/0068784 | A1 | 3/2016 | Vinson et al. |
| 2016/0068785 | A1 | 3/2016 | Vinson et al. |
| 2017/0137747 | A1 | 5/2017 | Tang |
| 2017/0175058 | A1 | 6/2017 | Depoot |
| 2017/0253839 | A1 | 9/2017 | Scheibel |
| 2018/0110697 | A1 | 4/2018 | Smith, III |
| 2019/0117544 | A1 | 4/2019 | Zhao et al. |
| 2020/0283705 | A1 | 9/2020 | Smets |
| 2020/0407665 | A1 | 12/2020 | Joos |
| 2022/0401332 | A1 | 12/2022 | Akintelure et al. |
| 2023/0174894 | A1 | 6/2023 | Stenger |
| 2023/0174896 | A1 | 6/2023 | Stenger et al. |
| 2023/0174901 | A1 | 6/2023 | Stenger et al. |

FOREIGN PATENT DOCUMENTS

| | | | |
|---|---|---|---|
| CA | 2271200 | A1 | 6/1998 |
| EP | 0439316 | A2 | 7/1991 |
| GB | 2208516 | A | 4/1989 |
| JP | 2010013579 | A | 1/2010 |
| WO | 9823566 | A1 | 6/1998 |
| WO | 2007064525 | A1 | 6/2007 |
| WO | 2013000571 | A1 | 1/2013 |
| WO | 2016040241 | A1 | 3/2016 |
| WO | 2016040248 | A2 | 3/2016 |
| WO | 2019055256 | A1 | 3/2019 |
| WO | 2021247801 | A1 | 12/2021 |

OTHER PUBLICATIONS

All Office Actions; U.S. Appl. No. 17/337,493, filed on Jun. 3, 2021.
All Office Actions; U.S. Appl. No. 17/339,004, filed on Jun. 4, 2021.
All Office Actions; U.S. Appl. No. 17/834,068, filed on Jun. 7, 2022.

*Primary Examiner* — Lorna M Douyon
(74) *Attorney, Agent, or Firm* — Andrew J. Mueller

(57) ABSTRACT

A water-soluble unit dose article containing a water-soluble film and a liquid laundry detergent composition having a first anionic surfactant, and a method of making the water-soluble unit dose article.

16 Claims, No Drawings

WATER-SOLUBLE UNIT DOSE ARTICLE

FIELD OF THE INVENTION

The present disclosure relates to a water-soluble unit dose article containing a water-soluble film a liquid laundry detergent composition having a first anionic surfactant, and a method of making said water-soluble unit dose article.

BACKGROUND OF THE INVENTION

Water-soluble unit dose articles are liked by consumers as they offer convenience and ease to the laundry process. Without wishing to be bound by theory, the water-soluble unit dose article comprises a water-soluble film and a unitized dose of a laundry detergent composition which may be within one or more compartments within the unit dose article. Consumers desire excellent cleaning performance from the water-soluble unit dose article.

During manufacture, usually, a first water-soluble film is deformed to make an open compartment. This open compartment is then filled with a liquid laundry detergent composition, and the filled open compartment is then closed with a second water-soluble film.

However, an issue during manufacture is that during dosing of the liquid laundry detergent composition, there can be a tendency for the liquid detergent to form a 'string' of liquid from the end of the filling nozzle. This 'string' occurs once the flow of the liquid laundry detergent composition through the nozzle ceases and the inherent viscosity of the liquid laundry detergent compositions causes a volume of the liquid to remain attached to the end of the nozzle. The action of gravity pulls this volume of liquid down, which eventually separates from the end of the nozzle. The issue is that the volume of separated liquid laundry detergent composition can then fall on an unintended area, such as the area of the water-soluble film that is sealed to the second film to close the open compartment. This is because once filling of the compartment is complete the apparatus moves to the next open compartment to start filling, and the volume of liquid laundry detergent composition can fall during that movement to the next open compartment. If the volume of liquid lands in the seal area this can cause seal failures and result in unwanted premature rupture of the water-soluble unit dose article.

This problem can be overcome by reducing the speed of the manufacturing apparatus to allow sufficient time for the 'string' to separate and land in the open compartment. However, such a reduction in line speed can result in lower manufacturing efficiency and increased costs.

Therefore, there is a need in the art for a water-soluble unit dose article that provides cleaning to fabrics but in which the time it takes for the 'string' to break during manufacture is reduced. Such reduced string breaking time results in increased manufacturing speeds.

It was surprisingly found that the present invention addressed this problem.

SUMMARY OF THE INVENTION

The present disclosure relates to a water-soluble unit dose article that includes a liquid laundry detergent composition and a water-soluble film; where the liquid laundry detergent composition includes a first anionic surfactant, where the first anionic surfactant includes a mixture of surfactant isomers according to Formula I and surfactant isomers according to Formula II:

(I)

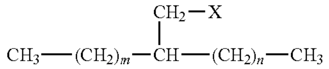

(II)

$$CH_3-(CH_2)_{m+n+3}-X$$

where m is between 4 and 11, and n is between 0 and 5, and where about 50% to about 100% by weight of the first anionic surfactant are isomers having m+n equal to 9, or where about 50% to about 100% by weight of the first anionic surfactant are isomers having m+n equal to 11; or where about 50% to about 100% by weight of the first anionic surfactant are a mixture of isomers having m+n equal to 9 or 11; and where between about 25% and about 50% by weight of the mixture of surfactant isomers of Formula I have n=0; and where from about 0.001% to about 25%, by weight of the first anionic surfactant are surfactants according to Formula II; and wherein X is sulfate.

The present disclosure also relates to a process of making a water-soluble unit dose article that includes the steps of:

a. deforming a first water-soluble film to create an open compartment;
b. dosing a liquid laundry detergent composition from a nozzle into the open compartment;
c. closing the filled open compartment from step b with a second water-soluble film;
d. sealing the first and second water-soluble films together.

where the liquid laundry detergent composition includes a first anionic surfactant, where the first anionic surfactant includes a mixture of surfactant isomers according to Formula I and surfactant isomers according to Formula II:

(I)

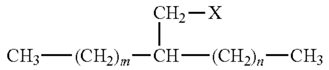

(II)

$$CH_3-(CH_2)_{m+n+3}-X$$

wherein m is between 4 and 11, and n is between 0 and 5, and wherein about 50% to about 100% by weight of the first anionic surfactant are isomers having m+n equal to 9, or wherein about 50% to about 100% by weight of the first anionic surfactant are isomers having m+n equal to 11; or wherein about 50% to about 100% by weight of the first anionic surfactant are a mixture of isomers having m+n equal to 9 or 11; and wherein between about 25% and about 50% by weight of the mixture of surfactant isomers of Formula I have n=0; and wherein from about 0.001% to about 25%, by weight of the first anionic surfactant are surfactants according to Formula II; and wherein X is sulfate.

DETAILED DESCRIPTION OF THE INVENTION

Water-Soluble Unit Dose Article

The present disclosure relates to a water-soluble unit dose article comprising a liquid laundry detergent composition and a water-soluble film. The liquid laundry detergent composition and the water-soluble film are described in more detail below.

The water-soluble unit dose article comprises the water-soluble film shaped such that the unit-dose article comprises at least one internal compartment surrounded by the water-soluble film. The unit dose article may comprise a first water-soluble film and a second water-soluble film sealed to one another such to define the internal compartment. The water-soluble unit dose article is constructed such that the liquid laundry detergent composition does not leak out of the compartment during storage. However, upon addition of the water-soluble unit dose article to water, the water-soluble film dissolves/disintegrates and releases the contents of the internal compartment into the wash liquor.

The compartment should be understood as meaning a closed internal space within the unit dose article, which holds the liquid laundry treatment composition. During manufacture, a first water-soluble film may be shaped to comprise an open compartment into which the liquid laundry detergent composition is added. A second water-soluble film is then laid over the first film in such an orientation as to close the opening of the compartment. The first and second films are then sealed together along a seal region.

The unit dose article may comprise more than one compartment, even at least two compartments, or even at least three compartments, or even at least four compartments. The compartments may be arranged in superposed orientation, i.e. one positioned on top of the other. In such an orientation the unit dose article will comprise at least three films, top, at least one middle and bottom. Alternatively, the compartments may be positioned in a side-by-side orientation, i.e. one orientated next to the other. The compartments may even be orientated in a 'tyre and rim' arrangement, i.e. a first compartment is positioned next to a second compartment, but the first compartment at least partially surrounds the second compartment but does not completely enclose the second compartment. Alternatively, one compartment may be completely enclosed within another compartment.

Wherein the unit dose article comprises at least two compartments, one of the compartments may be smaller than the other compartment. Wherein the unit dose article comprises at least three compartments, two of the compartments may be smaller than the third compartment, and preferably the smaller compartments are superposed on the larger compartment. The superposed compartments preferably are orientated side-by-side.

Wherein the unit dose article comprises at least four compartments, three of the compartments may be smaller than the fourth compartment, and preferably the smaller compartments are superposed on the larger compartment. The superposed compartments preferably are orientated side-by-side.

In a multi-compartment orientation, the detergent composition according to the present invention may be comprised in at least one of the compartments. It may for example be comprised in just one compartment, or may be comprised in two compartments, or even in three compartments, or even in all compartments.

Each compartment may comprise the same or different compositions. The different compositions could all be in the same form, or they may be in different forms.

The water-soluble unit dose article may comprise at least two internal compartments, wherein the liquid laundry detergent composition is comprised in at least one of the compartments, preferably wherein the unit dose article comprises at least three or even four compartments, wherein the liquid laundry detergent composition is comprised in at least one of the compartments.

Preferably, the water-soluble unit dose article comprises between 0 ppm and 20 ppm, preferably between 0 ppm and 15 ppm, more preferably between 0 ppm and 10 ppm, even more preferably between 0 ppm and 5 ppm, even more preferably between 0 ppm and 1 ppm, even more preferably between 0 ppb and 100 ppb, most preferably 0 ppb dioxane. Those skilled in the art will be aware of known techniques to determine dioxane levels.

Water-Soluble Film

The water-soluble film of the present invention is soluble or dispersible in water. The water-soluble film preferably has a thickness of from about 20 to about 150 micron, or from about 35 to about 125 microns, or from about 50 to about 110 microns, or about 76 microns.

Preferably, the film has a water-solubility of at least about 50%, or at least about 75% or about 95%, as measured by the method set out here after using a glass-filter with a maximum pore size of about 20 microns:

5 grams±0.1 gram of film material is added in a pre-weighed 3 L beaker and 2 L 5 ml of distilled water is added. This is stirred vigorously on a magnetic stirrer, Labline model No. 1250 or equivalent and 5 cm magnetic stirrer, set at about 600 rpm, for about 30 minutes at about 30° C. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersibility can be calculated.

The water-soluble film material can, for example, be obtained by casting, blow-molding, extrusion or blown extrusion of the polymeric material, as known in the art.

The terms "percent by weight", "weight percentage (wt. %)" and "weight-weight percentage (% w/w)" are used interchangeably herein. Percent by weight refers to the percentage of a material on a mass basis as it is comprised in a composition, mixture or solution.

The water-soluble film comprises polyvinylalcohol. The polyvinylalcohol may be present between about 50% and about 95%, or between about 55% and about 90%, or between about 60% and about 80% by weight of the water-soluble film. Preferably, the water-soluble film comprises polyvinyl alcohol homopolymer or polyvinylalcohol copolymer, preferably a blend of polyvinylalcohol homopolymers and/or anionic polyvinylalcohol copolymers preferably selected from sulphonated and carboxylated anionic polyvinylalcohol copolymers especially carboxylated anionic polyvinylalcohol copolymers, most preferably a blend of a polyvinylalcohol homopolymer and a carboxylated anionic polyvinylalcohol copolymer. Without wishing to be bound by theory, the term "homopolymer" generally includes polymers having a single type of monomeric repeating unit (e.g., a polymeric chain consisting of or consisting essentially of a single monomeric repeating unit). For the particular case of polyvinylalcohol, the term "homopolymer" further includes copolymers having a distribution of vinyl alcohol monomer units and optionally vinyl acetate monomer units, depending on the degree of hydrolysis (e.g., a polymeric chain consisting of or consisting essentially of vinyl alcohol and vinyl acetate monomer units). In the limiting case of about 100% hydrolysis, a polyvinylalcohol homopolymer can include a true homopolymer having only vinyl alcohol units. Without wishing to be bound by theory, the term "copolymer" generally includes polymers having two or more types of monomeric repeating units (e.g., a polymeric chain consisting of or consisting essentially of two or more different monomeric repeating units, whether as random copolymers, block copolymers, etc.). For the particular case of polyvinylalcohol, the term "copolymer" (or "polyvinylalcohol copolymer") further includes copolymers having a distribution of vinyl alcohol monomer units and vinyl acetate monomer units, depending on the degree of hydrolysis, as well as at least one other type of monomeric repeating unit (e.g., a ter- (or higher) polymeric chain consisting of or consisting essentially of vinyl alcohol monomer units, vinyl acetate monomer units, and one or more other monomer units, for example anionic monomer units). In the limiting case of 100% hydrolysis, a polyvinylalcohol copolymer can include a copolymer having vinyl alcohol units and one or more other monomer units, but no vinyl acetate units. Without wishing to be bound by theory, the term "anionic copolymer" includes copolymers having an anionic monomer unit comprising an anionic moiety. General classes of anionic monomer units which can be used for the anionic polyvinyl alcohol copolymer include the vinyl polymerization units corresponding to monocarboxylic acid vinyl monomers, their esters and anhydrides, dicarboxylic monomers having a polymerizable double bond, their esters and anhydrides, vinyl sulfonic acid monomers, and alkali metal salts of any of the foregoing. Examples of suitable anionic monomer units include the vinyl polymerization units corresponding to vinyl anionic monomers including vinyl acetic acid, maleic acid, monoalkyl maleate, dialkyl maleate, monomethyl maleate, dimethyl maleate, maleic anyhydride, fumaric acid, monoalkyl fumarate, dialkyl fumarate, monomethyl fumarate, dimethyl fumarate, fumaric anyhydride, itaconic acid, monomethyl itaconate, dimethyl itaconate, itaconic anhydride, vinyl sulfonic acid, allyl sulfonic acid, ethylene sulfonic acid, 2-acrylamido-1-methylpropanesulfonic acid, 2-acrylamido-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other C1-C4 or C6 alkyl esters), and combinations thereof (e.g., multiple types of anionic monomers or equivalent forms of the same anionic monomer). The anionic monomer may be one or more acrylamido methylpropanesulfonic acids (e.g., 2-acrylamido-1-methylpropanesulfonic acid, 2-acrylamido-2-methylpropanesulfonic acid, 2-methylacrylamido-2-methylpropanesulfonic acid), alkali metal salts thereof (e.g., sodium salts), and combinations thereof. Preferably, the anionic moiety of the first anionic monomer unit is selected from a sulphonate, a carboxylate, or a mixture thereof, more preferably a carboxylate, most preferably an acrylate, a methacrylate, a maleate, or a mixture thereof. Preferably, the anionic monomer unit is present in the anionic polyvinyl alcohol copolymer in an average amount in a range of between about 1 mol. % and about 10 mol. %, preferably between about 2 mol. % and about 5 mol. %. Preferably, the polyvinyl alcohol, and/or in case of polyvinylalcohol blends the individual polyvinylalcohol polymers, have an average viscosity (0 in a range of between about 4 mPa·s and about 30 mPa·s, preferably between about 10 mPa·s and about 25 mPa·s, measured as about a 4% polyvinyl alcohol copolymer solution in demineralized water at 20 degrees C. The viscosity of a polyvinyl alcohol polymer is determined by measuring a freshly made solution using a Brookfield LV type viscometer with UL adapter as described in British Standard EN ISO 15023-2:2006 Annex E Brookfield Test method. It is international practice to state the viscosity of about a 4% aqueous polyvinyl alcohol solutions at 20° C. It is well known in the art that the viscosity of an aqueous water-soluble polymer solution (polyvinylalcohol or otherwise) is correlated with the weight-average molecular weight of the same polymer, and often the viscosity is used as a proxy for weight-average molecular weight. Thus, the weight-average molecular weight of the polyvinylalcohol can be in a range of about 30,000 to about 175,000, or about 30,000 to about 100,000, or about 55,000 to about 80,000. Preferably, the polyvinyl alcohol, and/or in case of polyvinylalcohol blends the individual polyvinylalcohol polymers, have an average degree of hydrolysis in a range of between about 75% and about 99%, preferably between about 80% and about 95%, most preferably between about 85% and about 95%. A suitable test method to measure the degree of hydrolysis is as according to standard method JIS K6726 or NMR via techniques known to those skilled in the art.

Most preferably the polyvinylalcohol is a blend of a polyvinylalcohol homopolymer and a carboxylated anionic polyvinylalcohol copolymer, wherein the homopolymer and the anionic copolymer are present in a relative weight ratio of about 90/10 to about 10/90, preferably about 80/20 to about 20/80, more preferably about 70/30 to about 50/50.

Preferably, the water-soluble film comprises a non-aqueous plasticizer. Preferably, the non-aqueous plasticizer is selected from polyols, sugar alcohols, and mixtures thereof. Suitable polyols include polyols selected from the group consisting of glycerol, diglycerin, ethylene glycol, diethylene glycol, triethyleneglycol, tetraethylene glycol, polyethylene glycols up to 400 MW, neopentyl glycol, 1,2-propylene glycol, 1,3-propanediol, dipropylene glycol, polypropylene glycol, 2-methyl-1,3-propanediol, trimethylolpropane and polyether polyols, or a mixture thereof. Suitable sugar alcohols include sugar alcohols selected from the group consisting of isomalt, maltitol, sorbitol, xylitol, erythritol, adonitol, dulcitol, pentaerythritol and mannitol, or a mixture thereof. More preferably the non-aqueous plasticizer is selected from glycerol, 1,2-propanediol, dipropylene glycol, 2-methyl-1,3-propanediol, trimethylolpropane, triethyleneglycol, polyethyleneglycol, sorbitol, or a mixture thereof, most preferably selected from glycerol, sorbitol, trimethylolpropane, dipropylene glycol, and mixtures thereof. One particularly suitable plasticizer system includes a blend of glycerol, sorbitol and trimethylol propane. Another particularly suitable plasticizer system includes a blend of glycerin, dipropylene glycol, and sorbitol. Preferably, the film comprises between about 5% and about 50%, preferably between about 10% and about 40%, more preferably between about 20% and about 30% by weight of the film of the non-aqueous plasticizer.

Preferably, the water-soluble film comprises a surfactant. Preferably, the water-soluble film comprises a surfactant in an amount between about 0.1% and about 2.5%, preferably between about 1% and about 2% by weight of the water-soluble film. Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof.

Preferably the water-soluble film according to the invention comprises lubricants/release agents. Suitable lubricants/ release agents can include, but are not limited to, fatty acids and their 20 salts, fatty alcohols, fatty esters, fatty amines, fatty amine acetates and fatty amides. Preferred lubricants/release agents are fatty acids, fatty acid salts, and fatty amine acetates. the amount of lubricant/release agent in the water-soluble film is in a range of from about 0.02% to about 1.5%, preferably from about 0.1% to about 1% by weight of the water-soluble film.

Preferably, the water-soluble film comprises fillers, extenders, antiblocking agents, detackifying agents or a mixture thereof. Suitable fillers, extenders, antiblocking agents, detackifying agents or a mixture thereof include, but are not limited to, starches, modified starches, crosslinked polyvinylpyrrolidone, crosslinked cellulose, microcrystalline cellulose, silica, metallic oxides, calcium carbonate, talc and mica. Preferred materials are starches, modified starches and silica. Preferably, the amount of filler, extender, antiblocking agent, detackifying agent or mixture thereof in the water-soluble film is in a range of from about 0.1% to about 25%, preferably from about 1% to about 10%, more preferably from about 2% to about 8%, most preferably from about 3% to about 5% by weight of the water-soluble film. In the absence of starch, one preferred range for a suitable filler, extender, antiblocking agent, detackifying agent or mixture thereof is from about 0.1% to about 1%, preferably about 4%, more preferably about 6%, even more preferably from about 1% to about 4%, most preferably from about 1% to about 2.5%, by weight of the water-soluble film.

Preferably the water-soluble film according to the invention has a residual moisture content of at least about 4%, more preferably in a range of from about 4% to about 15%, even more preferably of from about 5% to about 10% by weight of the water-soluble film as measured by Karl Fischer titration.

Preferred films exhibit good dissolution in cold water, meaning unheated distilled water. Preferably such films exhibit good dissolution at temperatures of about 24° C., even more preferably at about 10° C. By good dissolution it is meant that the film exhibits water-solubility of at least about 50%, preferably at least about 75% or even at least about 95%, as measured by the method set out here after using a glass-filter with a maximum pore size of 20 microns, described above.

Preferred films include those supplied by Monosol under the trade references M8630, M8900, M8779, M8310. Non-limiting examples of further suitable water-soluble polyvinylalcohol films are commercially available from Nippon Gohsei company under the Hi-Selon tradename, from Sekisui company under the Advasol tradename, or from Aicello company under the Solublon tradename.

The film may be opaque, transparent or translucent. The film may comprise a printed area. The area of print may be achieved using standard techniques, such as flexographic printing or inkjet printing. Preferably, the ink used in the printed area comprises between about 0 ppm and about 20 ppm, preferably between about 0 ppm and about 15 ppm, more preferably between about 0 ppm and about 10 ppm, even more preferably between about 0 ppm and about 5 ppm, even more preferably between about 0 ppm and about 1 ppm, even more preferably between about 0 ppb and about 100 ppb, most preferably about 0 ppb dioxane. Those skilled in the art will be aware of known methods and techniques to determine the dioxane level within the ink formulations.

The film may comprise an aversive agent, for example a bittering agent. Suitable bittering agents include, but are not limited to, naringin, sucrose octaacetate, quinine hydrochloride, denatonium benzoate, or mixtures thereof. Any suitable level of aversive agent may be used in the film. Suitable levels include, but are not limited to, about 1 to about 5000 ppm, or even about 100 to about 2500 ppm, or even about 250 to about 2000 rpm.

Preferably, the water-soluble film or water-soluble unit dose article or both are coated in a lubricating agent, preferably, wherein the lubricating agent is selected from talc, zinc oxide, silicas, siloxanes, zeolites, silicic acid, alumina, sodium sulphate, potassium sulphate, calcium carbonate, magnesium carbonate, sodium citrate, sodium tripolyphosphate, potassium citrate, potassium tripolyphosphate, calcium stearate, zinc stearate, magnesium stearate, starch, modified starches, clay, kaolin, gypsum, cyclodextrins or mixtures thereof.

Liquid Laundry Detergent Composition

The water-soluble unit dose article comprises a liquid laundry treatment composition. The term 'liquid laundry treatment composition' refers to any laundry treatment composition comprising a liquid capable of wetting and treating a fabric, and includes, but is not limited to, liquids, gels, pastes, dispersions and the like. The liquid composition can include solids or gases in suitably subdivided form, but the liquid composition excludes forms which are non-fluid overall, such as tablets or granules.

The liquid laundry detergent composition comprises a first anionic surfactant. The first anionic surfactant is described in more detail below.

The liquid laundry detergent composition may comprise a further surfactant selected from a second anionic surfactant, a non-ionic surfactant or a mixture thereof. The second anionic surfactant may be selected from an alkoxylated alkyl sulphate anionic surfactant, a linear alkylbenzene sulphonate, or a mixture thereof.

The linear alkylbenzene sulphonate may comprise $C_{10}$-$C_{16}$ alkyl benzene sulfonate, $C_{11}$-$C_{14}$ alkyl benzene sulphonate, or a mixture thereof. The alkylbenzene sulphonate may be an amine neutralized alkylbenzene sulphonate, an alkali metal neutralized alkylbenzene sulphonate or a mixture thereof. The amine may be selected from monoethanolamine, triethanolamine or mixtures thereof. The alkali metal may be selected from sodium, potassium, magnesium or a mixture thereof. The liquid laundry detergent composition may comprise between about 5% and about 40%, or between about 10% and about 35%, or between about 15% and about 30% by weight of the liquid laundry treatment composition of the linear alkylbenzene sulphonate anionic surfactant.

The alkyl sulphate anionic surfactant may be a primary or a secondary alkyl sulphate anionic surfactant, or a mixture thereof. The alkoxylated alkyl sulphate may comprise ethoxylated alkyl sulphate, propoxylated alkyl sulphate, a mixed ethoxylated/propoxylated alkyl sulphate, or a mixture thereof. The ethoxylated alkyl sulphate may have an average degree of ethoxylation of between about 0.1 to about 5, or between about 0.5 and about 3. The ethoxylated alkyl sulphate may have an average alkyl chain length of between about 8 and about 18, or between about 10 and about 16, or between about 12 and about 15. The alkyl chain of the alkyl sulphate anionic surfactant may be linear, branched or a mixture thereof. The branched alkyl sulphate anionic surfactant may be a branched primary alkyl sulphate, a branched secondary alkyl sulphate, or a mixture thereof. It is preferred that the branching is in the 2-position, or alternatively might be present further down the alkyl chain, or could be multi-branched with branches spread over the alkyl chain. The weight average degree of branching of alkyl sulphate anionic surfactant may be from about 0% to about 100% or about 0% to about 95%, or from about 0% to about 60%, or from about 0% to about 20%. Alternatively, the weight average degree of branching of alkyl sulphate anionic surfactant may be from about 70% to about 100%, or from about 80% to about 90%. The alkyl chain may be selected from naturally derived material, synthetically derived material or mixtures thereof. The synthetically derived material may comprise oxo-synthesized material, Ziegler-synthesized material, Guerbet-synthesized material, Fischer-Tropsch—synthesized material, iso-alkyl synthesized material, or mixtures thereof. The liquid laundry detergent composition may comprise between about 1% and about 35%, or between about 3% and about 30%, or between about 6% and about 20% by weight of the liquid laundry treatment composition of the alkyl sulphate anionic surfactant. The weight ratio of alkyl sulphate to ethoxylated alkyl sulphate may be between 3:1 and 1:3.

The weight ratio of linear alkylbenzene sulphonate to alkoxylated alkyl sulphate may be from 1:2 to 9:1, or from 1:1 to 7:1, or from 1:1 to 5:1, or from 1:1 to 4:1.

The liquid laundry detergent composition may comprise a non-ionic surfactant, wherein the non-ionic surfactant preferably comprises an alkoxylated alcohol, wherein the alkoxylated alcohol is derived from a synthetical alcohol, a natural alcohol or a mixture thereof. The alkoxylated alcohol can be a primary alkoxylated alcohol, a secondary alkoxylated alcohol, or a mixture thereof. The alkoxylated alcohol may comprise ethoxylated alcohol, propoxylated alcohol, a mixed ethoxylated/propoxylated alcohol, or a mixture thereof. Alternatively, the alkoxylated alcohol might also include higher alkoxy groups such as butoxy groups. When mixed alkoxy groups, the alkoxy groups can be randomly ordered or present in blocks, preferably are present in blocks. For example, mixed ethoxy (EO)/propoxy (PO) groups might be ordered in EO/PO blocks, PO/EO blocks, EO/PO/EO blocks or PO/EO/PO blocks. Preferably, the ethoxylated alcohol has an average degree of ethoxylation of between about 0.1 to about 20, or between about 5 and about 15, or between about 6 and about 10. If propoxylation is present, the average degree of propoxylation may be between about 0.1 to about 25, or between about 2 and about 20, or between about 5 and about 10. The alkoxylated alcohol may have an average alkyl chain length of between about 8 and about 18, or between about 10 and about 16, or between about 12 and about 15. The alkyl chain of the alkoxylated alcohol may be linear, branched or a mixture thereof, wherein the branched alkyloxylated alcohol is a branched primary alkoxylated alcohol, a branched secondary alkoxylated alcohol, or a mixture thereof. Preferably, the weight average degree of branching of the alkoxylated alcohol is from about 0% to about 100% or from about 0% to about 95%, or from about 0% to about 60%, or from about 0% to about 20%. The branching can be on the 2-alkyl position, or alternatively further down the alkyl chain, or can be multi-branched with individual branches spread over the alkyl chain. Preferably, the synthetically derived material comprises oxo-synthesized material, Ziegler-synthesized material, Guerbet-synthesized material, Fischer-Tropsch—synthesized material, iso-alkyl branched materials, or mixtures thereof, preferably oxo-synthesised material. Preferably, the liquid laundry detergent composition comprises between about 0.5% and about 20%, or between about 1% and about 15%, or between about 3% and about 12% by weight of the liquid laundry detergent composition of the non-ionic surfactant.

The liquid detergent composition may comprise between about 20% and about 60%, by weight of the liquid laundry treatment composition of the first anionic surfactant, the second anionic surfactant and the non-ionic surfactant.

The ratio of the first anionic surfactant and the second anionic surfactant to the non-ionic surfactant may be from about 1:1 to about 20:1, from about 1.5:1 to about 17.5:1, from about 2:1 to about 15:1, or from about 2.5:1 to about 13:1.

The liquid laundry detergent composition may comprise between about 1% and about 15%, weight of the liquid laundry detergent composition of water.

The liquid laundry detergent composition may comprise an amphoteric surfactant. Preferably, the amphoteric surfactant is amine oxide. The amine oxide may be selected from $C_{12-14}$ dimethyl amine oxide or $C_{12-14}$ amido propyl dimethyl amine oxide, preferably $C_{12-14}$ dimethyl amine oxide, most preferably linear $C_{12-14}$ dimethyl amine oxide.

Typical linear amine oxides include water-soluble amine oxides containing one R1 $C_{8-18}$ alkyl moiety and 2 R2 and R3 moieties selected from the group consisting of $C_{1-3}$ alkyl groups and $C_{1-3}$ hydroxyalkyl groups. Preferably amine oxide is characterized by the formula R1-N(R2)(R3) O wherein $R_1$ is a $C_{8-18}$ alkyl and $R_2$ and $R_3$ are selected from the group consisting of methyl, ethyl, propyl, isopropyl, 2-hydroxethyl, 2-hydroxypropyl and 3-hydroxypropyl, preferably methyl. The linear amine oxide surfactants in particular may include linear $C_{10}$-$C_{18}$ alkyl dimethyl amine oxides and linear $C_8$-$C_{12}$ alkoxy ethyl dihydroxy ethyl amine oxides. Preferred amine oxides include linear $C_{10}$, linear $C_{10}$-$C_{12}$, and linear $C_{12}$-$C_{14}$ alkyl dimethyl amine oxides, most preferably linear C12-14 alkyl dimethyl amine oxide.

As used herein "mid-branched" means that the amine oxide has one alkyl moiety having $n_1$ carbon atoms with one alkyl branch on the alkyl moiety having n 2 carbon atoms. The alkyl branch is located on the α carbon from the nitrogen on the alkyl moiety. This type of branching for the amine oxide is also known in the art as an internal amine oxide. The total sum of $n_1$ and $n_2$ is from 10 to 24 carbon atoms, preferably from 12 to 20, and more preferably from 10 to 16. The number of carbon atoms for the one alkyl moiety ($n_1$) should be approximately the same number of carbon atoms as the one alkyl branch (n 2) such that the one alkyl moiety and the one alkyl branch are symmetric. As used herein "symmetric" means that $|n_1-n_2|$ is less than or equal to 5, preferably 4, most preferably from 0 to 4 carbon atoms in at least 50 wt %, more preferably at least 75 wt % to 100 wt % of the mid-branched amine oxides for use herein.

The most preferred amine oxide comprises at least 50 wt %, preferably at least 60 wt %, more preferably at least 75 wt % to 100 wt % of linear C12-C14 alkyl dimethyl amine oxide by weight of the amine oxide surfactant.

The liquid laundry detergent composition may comprise from about 0.01% to about 20%, or from about 0.2% to about 15%, or from about 0.5% to about 10%, or from about 1% to about 5% by weight of the liquid detergent composition of the amphoteric surfactant.

The liquid laundry detergent composition may comprise a fatty acid, where the fatty acid may be a neutralized fatty acid soap. The liquid laundry detergent composition may comprise between about 1.5% and about 20%, or between about 2% and about 15%, or between about 3% and about 10%, or between about 4% and about 8% by weight of the liquid laundry detergent composition of fatty acid. The fatty acid may be branched or linear, alkoxylated or non-alkoxylated and preferably is selected from palm kernel fatty acid, coconut fatty acid, rapeseed fatty acid, neutralized palm kernel fatty acid, neutralized coconut fatty acid, neutralized rapeseed fatty acid, or mixture thereof, most preferably a neutralized palm kernel fatty acid. The fatty acid soap may be neutralised with an alkali metal, an amine, or a mixture thereof. The amine may be selected from monoethanolamine, triethanolamine or mixtures thereof and the alkali metal may be selected from sodium, potassium, magnesium or a mixture thereof.

The liquid laundry detergent composition may comprise one or more adjunct ingredients selected from the list comprising surfactants, polymers, dues, hueing dyes, bleaches, perfume, encapsulated perfumes, enzymes solvents or a mixture thereof.

First Anionic Surfactant

The first anionic surfactant comprises a mixture of surfactant isomers according to Formula I and surfactant isomers according to Formula II:

(I)

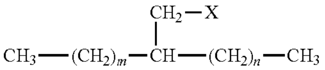

(II)

$$CH_3-(CH_2)_{m+n+3}-X$$

wherein m is between 4 and 11, and n is between 0 and 5, and wherein about 50% to about 100% by weight of the first anionic surfactant are isomers having m+n equal to 9, or wherein about 50% to about 100% by weight of the first anionic surfactant are isomers having m+n equal to 11;

or wherein about 50% to about 100% by weight of the first anionic surfactant are a mixture of isomers having m+n equal to 9 or 11; and wherein between about 25% and about 50% by weight of the mixture of surfactant isomers of Formula I have n=0; and wherein from about 0.001% to about 25%, by weight of the first anionic surfactant are surfactants according to Formula II; and wherein X is sulfate.

The water-soluble unit dose article may comprise between about 1% and about 20% by weight of the water-soluble unit dose article of the first anionic surfactant. The water-soluble unit dose article may comprise between about 2% and about 10% by weight of the water-soluble unit dose article of the first anionic surfactant.

m may be between 6 and 11.

The first surfactant may have between about 15% to about 40% of the mixture of surfactant isomers of Formula I have n=1, such as, for example between about 20% to about 40%, between about 25% to about 35%, or between about 30% to about 40%. The first surfactant may have between about 60% to about 90% of the mixture of surfactant isomers of Formula I have n<3, such as, for example between about 65% and 85%, between about 70% and 90%, or between about 80% and 90%. The detergent composition may have between about 90% to about 100% of the first surfactant where the isomers have m+n=11, such as, for example between about 95% and 100%. The detergent composition may have between about 90% to about 100% of the first surfactant where the isomers have m+n=9, such as, for example between about 95% and 100%.

The first surfactant may have from about 15% to about 40% by weight of the first surfactant mixture are isomers of Formula I with n=1 and from about 5% to about 20% by weight of the first surfactant mixture are isomers of Formula I with n=2. The first surfactant may have no isomers of Formula I with n equal to or greater than 6. The first surfactant may have up to about 40% of the mixture of surfactant isomers of Formula I with n>2. The first surfactant may have up to about 25% of the mixture of surfactant isomers of Formula I have n>2. The first surfactant may have up to about 20% by weight of the Formula II isomer.

Method of Making the First Anionic Surfactant

A two-step process can be used to produce branched aldehyde products from linear alpha olefin feedstocks, from which the alkyl sulfate anionic surfactants as described herein can be derived. The two-step process uses a rhodium organophosphorus catalyst for both a first process step and a second step. The first step is an isomerization reaction step and the second process step is a hydroformylation reaction step. The branched aldehydes can undergo a further hydrogenation step to produce branched alcohols.

The isomerization and hydroformylation reactions disclosed herein can be catalyzed by a rhodium organophosphorus catalyst which can be at least one of: (1) an organometallic complex of rhodium and one type of an organophosphorus ligand; (2) or an organometallic complex of rhodium and more than one type of an organophosphorus ligand.

The organophosphorous ligand can be a phosphine. In a nonlimiting example of a phosphine ligand, the phosphine ligand can be triphenylphosphine. The organophosphorous ligand can also be a phosphite. In a nonlimiting example of a phosphite ligand, the phosphite ligand can be tris (2, 4-di-t-butylphenyl) phosphite. A mixture of organophosphorous ligands of different types can also be used, such as a mixture of a phosphine and a phosphite. In a nonlimiting example of a mixture of organophosphorous ligands, the organophosphorous ligands can be a mixture of triphenylphosphine and tris (2, 4-di-t-butylphenyl) phosphite. The reaction system can contain an inert high-boiling solvent, for example a polyalphaolefin. The first catalyst can be formed when the molar ratio of phosphorous to rhodium is in a range of 1:1 to 1000:1, or 5:1 to 50:1, or 15:1 to 25:1. The rhodium concentration can be in a range of 1 ppm to 1000 ppm, or 10 ppm to 200 ppm, or 25 ppm to 75 ppm. The CO to H2 molar ratio can be in a range of 10:1 to 1:10, or 2:1 to 1:2, or 1.3:1 to 1:1.3.

During the isomerization reaction, the first step can be a reaction isomerizing a linear alpha olefin in the presence of Carbon Monoxide (CO) and Hydrogen (H2) at a first pressure. The isomerizing can be catalyzed by the rhodium organophosphorus catalyst which can be at least one of: (1) an organometallic complex of rhodium and one type of an organophosphorus ligand; (2) or an organometallic complex of rhodium and more than one type of an organophosphorus ligand. The isomerization reactions can produce an isomerized olefin comprising linear internal olefins of the same or different types.

The isomerization step can be performed at a temperature in a range of 30° C. to 500° C., or 50° C. to 150° C., or 70° C. to 100° C. The isomerization step can be performed at a gauge pressure in a range of 0.1 bar (0.01 MPa above atmospheric) to 10 bar (1 MPa above atmospheric), or 0.5 bar (0.05 MPa above atmospheric) to 5 bar (0.5 MPa above atmospheric), or 1 bar (0.1 MPa above atmospheric) to 2 bar (0.2 MPa above atmospheric).

The isomerizing step can produce a reaction product comprising a 20 wt. % or greater isomerized olefin, or a 40 wt. % or greater isomerized olefin, or a 60 wt. % or greater isomerized olefin, or a 90 wt. % or greater isomerized olefin.

During the hydroformylation reaction step, the isomerized olefin is hydroformylated in the presence of CO and H2 at a second pressure higher than the first pressure to produce a branched aldehyde. The hydroformylation reaction can be catalyzed by the rhodium organophosphorus catalyst which can be at least one of: (1) an organometallic complex of rhodium and one type of an organophosphorus ligand; (2) or an organometallic complex of rhodium and more than one type of an organophosphorus ligand. The resultant branched aldehyde is a 2-alkyl branched aldehyde. When the linear alpha olefin is 1-dodecene, the resultant branched aldehyde is a branched C13 aldehyde. When the linear alpha olefin is 1-tetradecene, the resultant branched aldehyde is a branched C15 aldehyde.

The hydroformylating step can be performed at a temperature in a range of 30° C. to 500° C., or 50° C. to 150° C., or 70° C. to 100° C. The hydroformylating step can be performed at a gauge pressure in a range of 5 bar (0.5 MPa above atmospheric) to 400 bar (40 MPa above atmospheric), or 10 bar (1.0 MPa above atmospheric) to 100 bar (10 MPa above atmospheric), or 15 bar (1.5 MPa above atmospheric) to 20 bar (2 MPa above atmospheric).

The hydroformylating step can produce a reaction product comprising a 25 wt. % or greater branched aldehyde, or a 40 wt. % or greater branched aldehyde, or a 60 wt. % or greater branched aldehyde, or a 90 wt. % or greater branched aldehyde.

The products of the hydroformylation reaction can be distilled. The process can have the step of separating the branched aldehyde products resulting from hydroformylation as an overhead product from the first catalyst stream via a distillation process. The distillation step can be performed at a temperature in a range of 100° C. to 200° C., or 125° C. to 175° C. The distillation step can be performed under vacuum at a pressure of less than 500 millibar absolute (0.05 MPa), or less than 100 millibar absolute (0.01 MPa), or less than 30 millibar absolute (0.003 MPa), The process can also have the steps of: hydrogenating the branched aldehyde product in the presence of a hydrogenation catalyst to produce a branched alcohols product composition. The hydrogenating catalyst can be a base metal catalyst, a supported nickel catalyst, a supported cobalt catalyst, a Raney® (W. R. Grace & Co., 7500 Grace Drive, Columbia, MD 21044) nickel catalyst or a precious metal catalyst. The hydrogenating step can be performed at a temperature in a range of 30° C. to 500° C., or 50° C. to 200° C., or 100° C. to 150° C. The hydrogenating step can be performed at a gauge pressure in a range of 5 bar (0.5 MPa above atmospheric) to 400 bar (40 MPa above atmospheric), or 10 bar (1 MPa above atmospheric) to 100 bar (10 MPa above atmospheric), or 30 bar (3 MPa above atmospheric) to 50 bar (5 MPa above atmospheric).

The hydrogenating step can produce a reaction product comprising 25 wt % or greater branched alcohols, or 40 wt % or greater branched alcohols, or 60 wt % or greater branched alcohols, or 90 wt. % or greater branched alcohols.

Alkyl sulfates are typically prepared by the reaction of fatty alcohols with sulfur trioxide ($SO_3$) or its derivatives or by the reaction of unsaturated compounds with sulfuric acid. Processes using sulfur trioxide in particular have gained prominence for fabricating alkyl sulfate anionic surfactants for use in detergent compositions.

Suitable derivatives of Sulfur trioxide include sulfur trioxide complexes such as chlorosulfonic acid, sulfuric acid, or sulfamic acid. Sulfur trioxide is preferred since it tends to result in more pure products. The sulfation reaction typically takes place in a continuous process using a cascade, falling film or tube bundle reactor, with the sulfur trioxide being applied in an equimolar or small excess, usually in a temperature range of 20° C. to 60° C., with the reaction temperature being determined at least partially by the solidification point of the fatty alcohol in the reaction. The reaction typically results in the acid form of the alkyl sulfate anionic surfactant which is typically neutralised in a subsequent step, using an alkali such as sodium hydroxide, potassium hydroxide, magnesium hydroxide lithium hydroxide, calcium hydroxide, ammonium hydroxide, monoethanolamine, diethanolamine, triethanolamine, monoisopropanolamine, diamines, polyamines, primary amines, secondary amines, tertiary amines, amine containing surfactants, and mixtures thereof.

Also, it is well known that the process of sulfating fatty alcohols to yield alkyl sulfate anionic surfactants also yields various impurities. The exact nature of these impurities depends on the conditions of sulfation and neutralization. Generally, however, the impurities of the sulfation process include one or more inorganic salts, unreacted fatty alcohol, and olefins ("The Effect of Reaction By-Products on the Viscosities of Sodium Lauryl Sulfate Solutions," Journal of the American Oil Chemists' Society, Vol. 55, No. 12, p. 909-913 (1978), C. F. Putnik and S. E. McGuire). The level of non alkyl sulfate impurities in the alkyl sulfate anionic surfactant of the present invention can be less than 6% by weight, preferably less than 4% by weight, and most preferably less than 2% by weight of the alkyl sulfate anionic surfactant. For alkyl alkoxy sulfates, the fatty alcohol is first alkoxylated before sulfation. Alkoxylation is a process that reacts lower molecular weight epoxides (oxiranes), such as ethylene oxide, propylene oxide, and butylene oxide with the fatty alcohol. These epoxides are capable of reacting with the fatty alcohol using various base or acid catalysts. In base catalyzed alkoxylation, an alcoholate anion, formed initially by reaction with a catalyst (alkali metal, alkali metal oxide, carbonate, hydroxide, or alkoxide), nucleophilically attacks the epoxide.

Traditional alkaline catalysts for alkoxylation include potassium hydroxide and sodium hydroxide, which give rise to a somewhat broader distribution of alkoxylates. Other catalysts have been developed for alkoxylation that provide a more narrow distribution of alkoxylate oligomers. Suitable examples of narrow range alkoxylation catalysts include many alkaline earth (Mg, Ca, Ba, Sr, etc.) derived catalysts, Lewis acid catalysts, such as Zirconium dodecanoxide sulfate, and certain boron halide catalysts. A specific average degree of alkoxylation may be achieved by selecting the starting quantities of fatty alcohol and ethylene oxide or by blending together varying amounts of alkoxylated surfactants differing from one another in average degree of alkoxylation.

Impurities

The process of making the 2-alkyl primary alcohol-derived surfactants of the invention may produce various impurities and/or contaminants at different steps of the process.

The C14 olefin and C12 olefin sources used in the hydroformylation to make the starting C15 aldehydes and C13 aldehydes and subsequent alcohols and corresponding surfactants of use in the present invention may have low levels of impurities that lead to impurities in the starting C15 alcohols and C13 alcohol and therefore also in the C15 alkyl sulfate and C13 alkyl sulfate. While not intending to be limited by theory, such impurities present in the C14 olefin and C12 olefin feeds can include vinylidene olefins, branched olefins, paraffins, aromatic components, and low levels of olefins having chain-lengths other than the intended 14 carbons or 12 carbons. Branched and vinylidene olefins are typically at or below 5% in C14 and C12 alpha olefin sources. Impurities in the resulting C15 alcohols and C13 alcohols can include low levels of linear and branched alcohols in the range of C10 to C17 alcohols, especially C11 and C15 alcohols in the C13 alcohol, and especially C13 and C17 alcohols in the C15 alcohol, typically less than 5% by weight of the mixture, preferably less than 1%; low levels of branching in positions other than the 2-alkyl position resulting from branched and vinylidene olefins are typically less than about 5% by weight of the alcohol mixture, preferably less than 2%; paraffins and olefins, typically less than 1% by weight of the alcohol mixture, preferably less than about 0.5%; low levels of aldehydes with a carbonyl value typically below 500 mg/kg, preferably less than about 200 mg/kg. These impurities in the alcohol can result in low levels of paraffin, linear and branched alkyl sulfates having total carbon numbers other than C15 or C13, and alkyl sulfates with branching in positions other than the 2-alkyl location, wherein these branches can vary in length, but are typically linear alkyl chains having from 1 to 6 carbons. The step of hydroformylation may also yield impurities, such as linear and branched paraffins, residual olefin from incomplete hydroformylation, as well as esters, formates, and heavy-ends (dimers, trimers). Impurities that are not reduced to alcohol in the hydrogenation step may be removed during the final purification of the alcohol by distillation. Also, it is well known that the process of sulfating fatty alcohols to yield alkyl sulfate surfactants also yields various impurities. The exact nature of these impurities depends on the conditions of sulfation and neutralization. Generally, however, the impurities of the sulfation process include one or more inorganic salts, unreacted fatty alcohol, and olefins ("The Effect of Reaction By-Products on the Viscosities of Sodium Lauryl Sulfate Solutions," *Journal of the American Oil Chemists' Society*, Vol. 55, No. 12, p. 909-913 (1978), C. F. Putnik and S. E. McGuire).

Alkoxylation impurities may include dialkyl ethers, polyalkylene glycol dialkyl ethers, olefins, and polyalkylene glycols. Impurities can also include the catalysts or components of the catalysts that are used in various steps.

SYNTHESIS EXAMPLES

The following examples are representative and non-limiting.

Alcohol Compositions—Using the above-described process (Rh hydroformylation, hydrogenation), the alcohol compositions described in Examples 1 and 2 are obtained and analyzed by gas chromatography with flame ionization detection (GC/FID). The samples are prepared as a 1% (w/v) dichloromethane solution and injected into a capillary GC Column: DB-1 HT 15 m×0.25 mm ID, 0.1 μm film thickness, using an oven temperature program [initial temperature 80° C. (1 min), ramp 10° C./min to 220° C., ramp 30° C./min to 350° C. (1 min)] for a total run time of 19 minutes. Additional GC parameters include Column Flow: 1.4 ml/min ($H_2$), Injection Temperature: 300° C., Sample Amount: 1 μL, Split Ratio: 1/400, FID Temperature: 350° C., $H_2$ Flow: 40 mL/min, Air Flow: 400 mL/min, and Makeup Gas Flow: 25 mL/min.

Synthesis Example 1: Preparation of a Branched C13 Alcohol Product

A C12 linear alpha olefin feedstock (1-Dodecene) was obtained from the Chevron Phillips Chemical Company LP, as identified by product name AlphaPlus® 1-Dodecene (Chevron Phillips Chemical Company LP, P.O. Box 4910, The Woodlands, TX 77387-4910, US, phone (800) 231-3260). The homogeneous rhodium organophosphorus catalyst used in this example is prepared in a high pressure, stainless steel stirred autoclave. To the autoclave was added 0.027 wt. % Rh(CO)2ACAC ((Acetylacetonato)dicarbonylrhodium(I)), 1.36 wt. % tris (2,4,-di-t-butylphenyl) phosphite ligand and 98.62 wt. % Synfluid® PAO 4 cSt (Chevron Phillips Chemical Company LP, P.O. Box 4910, The Woodlands, TX 77387-4910, phone (800) 231-3260) inert solvent. The mixture was heated at 80° C. in the presence of a CO/H2 atmosphere and 2 bar (g) pressure for four hours to produce the active rhodium catalyst solution (109 ppm rhodium, P:Rh molar ratio=20). The 1-Dodecene linear alpha olefin was added to the rhodium catalyst solution in the autoclave producing a starting reaction mixture with a rhodium concentration of 35 ppm. The alpha olefin feed was then isomerized at 80° C. in the presence of a CO/H2 atmosphere and 1 bar (g) pressure for 10 hours. The isomerized olefin was then hydroformylated at 70° C. in the presence of a CO/H2 atmosphere and 20 bar (g) pressure for 8 hours. The molar ratio of CO to H2 in both the isomerization step and the hydroformylation step was equal to 1:1.15. The resulting hydroformylation reaction product was flash distilled at 140-150° C. and 25 millibar to recover the rhodium catalyst solution as a bottoms product and recover a branched C13 Aldehyde overheads product with a composition comprising:

| | Weight % |
|---|---|
| 1-Tridecanal | 13.9% |
| 2-Methyl-dodecanal | 28.3% |
| 2-Ethyl-undecanal | 15.2% |
| 2-Propyl-decanal | 14.5% |
| 2-Butyl-nonanal | 13.6% |
| 2-Pentyl-octanal | 12.6% |
| TOTAL | 98.0% |

The weight % branching in the branched C13 aldehyde product was 86.2%. The branched C13 aldehyde product was hydrogenated in a high pressure, Inconel 625 stirred autoclave at 150 C and 20 bar (g) hydrogen pressure. The hydrogenation catalyst used was a Raney® Nickel 3111 (W. R. Grace & Co., 7500 Grace Drive, Columbia, MD 21044, US, phone 1-410-531-4000) catalyst used at a 0.25 wt. % loading. The aldehyde was hydrogenated for 10 hours and the resultant reaction mixture was filtered to produce a branched C13 alcohol product comprising:

| | Weight % |
|---|---|
| 1-Tridecanol | 13.36 wt % |
| 2-Methyl-dodecanol | 28.95 wt % |
| 2-Ethyl-undecanol | 16.25 wt % |
| 2-Propyl-decanol | 13.92 wt % |
| 2-Butyl-nonanol | 13.46 wt % |
| 2-Pentyl-octanol | 13.02 wt % |
| Other | 1.04 wt % |

The weight % 2-alkyl branching in the branched C13 alcohol product was 85.6%.

Synthesis Example 2: Preparation of a Branched C15 Alcohol Product

The recovered rhodium catalyst stream from synthesis Example 1 was charged to a high pressure, stainless steel stirred autoclave and a C14 linear alpha olefin feedstock (1-Tetradecene) from the Chevron Phillips Chemical Company LP, (AlphaPlus® 1-Tetradecene by Chevron Phillips Chemical Company LP, P.O. Box 4910, The Woodlands, TX 77387-4910, phone (800) 231-3260) was added. The resulting mixture had a rhodium concentration of approximately 30 ppm. The 1-tetradecene linear alpha olefin was then isomerized at 80° C. in the presence of a CO/H2 atmosphere and 1 bar (g) pressure for 12 hours. The isomerized olefin was then hydroformylated at 70° C. in the presence of a CO/H2 atmosphere and 20 bar (g) pressure for 8 hours. The resulting reaction product was flash distilled at 150-160° C. and 25 millibar to recover the rhodium catalyst solution as a bottoms product and recover a branched C15 Aldehyde overheads product. The recovered rhodium catalyst solution was then used again to complete a second 1-tetradecene batch isomerization (4 hours) and hydroformylation (6 hours). The resulting C15 aldehyde products from the two batches were combined to give a branched C15 Aldehyde product comprising:

| | Weight % |
|---|---|
| 1-Pentadecanal | 12.1% |
| 2-Methyl-tetradecanal | 34.1% |
| 2-Ethyl-tridecanal | 21.9% |
| 2-Propyl-dodecanal | 14.0% |
| 2-Butyl-undecanal | 8.6% |
| 2-Pentyl-decanal + 2-hexyl-decanal | 9.0% |
| TOTAL | 99.6% |

The weight % branching in the branched C15 aldehyde product was 87.8%. The branched C15 aldehyde product was hydrogenated in a high pressure, Inconel 625 stirred autoclave at 150 C and 20 bar (g) hydrogen pressure. The hydrogenation catalyst used was a Raney® Nickel 3111 (W. R. Grace & Co., 7500 Grace Drive, Columbia, MD 21044, US, phone 1-410-531-4000) catalyst used at a 0.25 wt. % loading. The aldehyde was hydrogenated for 10 hours and the resultant reaction mixture was filtered to produce a branched C15 alcohol product comprising:

| | Weight % |
|---|---|
| 1-Pentadecanol | 13.7% |
| 2-Methyl-tetradecanol | 32.6% |
| 2-Ethyl-tridecanol | 21.7% |
| 2-Propyl-dodecanol | 12.4% |
| 2-Butyl-undecanol | 8.0% |
| 2-Pentyl-decanol + 2-hexyl-decanol | 9.0% |
| Other | 2.7% |

The weight % 2-alkyl branching in the branched C15 alcohols product was 83.6%.

Synthesis Example 3. Synthesis of Narrow Branched Pentadecanol (C15) Sulfate Using a Falling Film Sulfation Reactor (Inventive Example 3)

The alcohol from synthesis Example 2 is sulfated in a falling film using a Chemithon single 15 mm×2 m tube reactor using SO3 generated from a sulfur burning gas plant operating at 5.5 lb/hr sulfur to produce 3.76% SO3 on a volume basis. Alcohol feed rate is 17.4 kg/hour and feed temperature was 83 F. Conversion of the alcohol to alcohol sulfate acid mix was achieved with 97% completeness. Neutralization with 50% sodium hydroxide is completed at ambient process temperature to 0.54% excess sodium hydroxide. 30 gallons of sodium neutralized C15 narrow branched Alcohol Sulfate paste. Analyses by standard Cationic SO3 titration method determines final average product activity to be 74.5%. The average unsulfated level is 2.65% w/w.

Synthesis Example 4. Synthesis of Narrow Branched Tridecanol (C13) Sulfate Using a Falling Film Sulfation Reactor (Inventive Example 4)

The alcohol from Synthesis Example 1 is sulfated in a falling film using a Chemithon single 15 mm×2 m tube reactor using SO3 generated from a sulfur burning gas plant operating at 5.5 lb/hr sulfur to produce 3.76% SO3 on a volume basis. Alcohol feed rate is 15.2 kg/hour and feed temperature is 81 F. Conversion of the alcohol to alcohol sulfate acid mix was achieved with 96.5% completeness. Neutralization with 50% sodium hydroxide is completed at ambient process temperature to 0.65% excess sodium hydroxide. 33 gallons of sodium neutralized C13 narrow branched Alcohol Sulfate paste. Analyses by standard Cationic SO3 titration method determines final average product activity to be 73.4%. The average unsulfated level is 2.10% w/w.

Alkyl Sulfates

TABLE 1

Alkyl chain distribution of the first anionic surfactant C15 Alkyl Sulfates based on starting distribution of alcohol

| | Neodol ®5 (ex Shell) | C15 Alcohol from U.S. Pat. No. 9,493,725 (ex Sasol) | Inventive Example 3 C15 Alkyl Sulfate made from Example 2 C15 Alcohol |
|---|---|---|---|
| Linear C15 * | 79.3 | 8.6 | 13.7 |
| 2-Alkyl Branched C15 | 17.5 | 89.5 | 83.6 |
| Other* | 3.2 | 1.9 | 2.7 |
| 2-methyl* | 7.0 | 19.0 | 32.6 |
| 2-ethyl* | 2.8 | 12.0 | 21.7 |
| 2-propyl* | 1.9 | 12.7 | 12.4 |
| 2-butyl* | 2.0 | 14.6 | 8.0 |
| 2-pentyl + 2-hexyl* | 3.8 | 31.2 | 9.0 |
| 2-Alkyl Branch Distribution | | | |
| 2-methyl** | 39.9% | 21.2% | 38.9% |
| 2-ethyl** | 16.2% | 13.4% | 25.9% |
| 2-propyl** | 10.7% | 14.2% | 14.9% |
| 2-butyl** | 11.3% | 16.3% | 9.5% |
| 2-pentyl + 2-hexyl** | 21.9% | 34.9% | 10.7% |

*by weight of starting alcohol

**by weight of 2-alkyl branched C15 alcohol

TABLE 2

Alkyl chain distribution of C13 Alkyl Sulfates based on starting distribution of alcohol

| | Neodol ® 3 (ex Shell) | Isalchem ® C13 Alcohol (ex Sasol) | Inventive Example 4 C13 Alkyl Sulfate made from Example 1 C13 Alcohol |
|---|---|---|---|
| Linear C13* | 78.3 | 5.3 | 13.4 |
| 2-Alkyl Branched C13 * | 18.1 | 91.3 | 85.6 |
| Other* | 3.6 | 3.4 | 1.0 |
| 2-methyl* | 8.1 | 19.1 | 29.0 |
| 2-ethyl* | 2.8 | 15.7 | 16.3 |
| 2-propyl* | 2.4 | 16.9 | 13.9 |
| 2-butyl* | 2.4 | 16.1 | 13.5 |
| 2-pentyl* | 2.4 | 23.4 | 13.0 |
| 2-Alkyl Branch Distribution | | | |
| 2-methyl** | 44.7% | 21.0% | 33.8% |
| 2-ethyl** | 15.2% | 17.2% | 19.0% |
| 2-propyl** | 13.4% | 18.5% | 16.3% |
| 2-butyl** | 13.3% | 17.7% | 15.7% |
| 2-pentyl** | 13.5% | 25.6% | 15.2% |

*by weight of starting alcohol

**by weight of 2-alkyl branched C13 alcohol

Process of Making a Water-Soluble Unit Dose Article

The present disclosure also relates to a process of making a water-soluble unit dose article comprising the steps of:

a. Deforming a first water-soluble film to create an open compartment;

b. Dosing a liquid laundry detergent composition from a nozzle into the open compartment;

c. Closing the filled open compartment from step b with a second water-soluble film;

d. Sealing the first and second water-soluble films together.

wherein, the liquid laundry detergent composition comprises a first anionic surfactant, wherein said first anionic surfactant comprises a mixture of surfactant isomers according to Formula I and surfactant isomers according to Formula II:

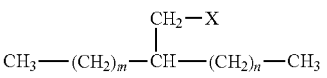

(I)

$$CH_3—(CH_2)_{m+n+3}—X \quad (II)$$

wherein m is between 4 and 11, and n is between 0 and 5, and wherein about 50% to about 100% by weight of the first anionic surfactant are isomers having m+n equal to 9, or wherein about 50% to about 100% by weight of the first anionic surfactant are isomers having m+n equal to 11;

or wherein about 50% to about 100% by weight of the first anionic surfactant are a mixture of isomers having m+n equal to 9 or 11; and wherein between about 25% and about 50% by weight of the mixture of surfactant isomers of Formula I have n=0; and wherein from about 0.001% to about 25%, by weight of the first anionic surfactant are surfactants according to Formula II; and wherein X is sulfate.

The first anionic surfactant is described in more detail above. The water-soluble film is described in more detail above. The liquid laundry detergent composition is described in more detail above.

The first water-soluble film may create a seal area adjacent to the open compartment, and wherein the first and second water-soluble films are sealed together in the seal area.

Those skilled in the art will be aware of suitable nozzles for filling the open compartment with the liquid laundry detergent composition. The open compartments may be formed by deforming the water-soluble film into a mold. The mold may be present on a flat surface or on a curved surface.

Those skilled in the art will be aware of suitable means to seal the first and second water-soluble films. Such means include heat sealing, solvent sealing or a mixture thereof.

METHOD OF USE

The present disclosure also relates to a process for washing fabrics comprising the steps of diluting a water-soluble unit dose article according to the present invention in water by a factor of between about 200 and about 3000 fold to create a wash liquor and contacting fabrics to be washed with said wash liquor. The wash liquor may comprise between about 5 L and about 75 L, or between about 7 L and about 40 L, or between about 10 L and about 20 L of water. The wash liquor may be at a temperature of between about 5° C. and about 90° C., or between about 10° C. and about 60° C., or between about 12° C. and about 45° C., or between about 15° C. and about 40° C. Washing the fabrics in the wash liquor may take between about 5 minutes and about 50 minutes, or between about 5 minutes and about 40 minutes, or between about 5 minutes and about 30 minutes, or between about 5 minutes and about 20 minutes, or between about 6 minutes and about 18 minutes to complete. The wash liquor may comprise between about 1 kg and about 20 kg, or between about 3 kg and about 15 kg, or between about 5 kg and about 10 kg of fabrics. The wash liquor may comprise water of any hardness preferably varying between about 0 gpg to about 40 gpg.

EXAMPLES

The impact of variations within the starting alcohol selected for the alkyl sulphate anionic surfactant within a water-soluble unit dose liquid laundry detergent composition on liquid stringing performance has been assessed following the test method described herein. Table 1 summarizes the detailed liquid detergent compositions tested, prepared through mixing of the individual raw materials in a batch type process. Inventive examples 1 and 2 comprise alkyl sulphate anionic surfactants based on a starting alcohol according to the invention, differing amongst them on average number of carbon atoms within the alkyl chain, e.g. C13 versus C15. Comparative examples 1 to 4 comprise alkyl sulphate anionic surfactants based on a starting alcohol outside the scope of to the invention, differing in average degree of branching and/or branching distribution, e.g. relative distribution of methyl, ethyl, propyl, butyl and pentyl branched groups at the 2-position, the inventive alkyl sulphate comprising a higher methyl to pentyl branching ratio at comparable average branching levels.

TABLE 1

| Liquid detergent compositions. | | | | | | |
|---|---|---|---|---|---|---|
| | Inventive example 1 | Inventive example 2 | Comparative example 1 | Comparative example 2 | Comparative example 3 | Comparative example 4 |
| C13AS according to invention[1] | 6.3% | — | — | — | — | — |
| C15AS according to invention[2] | — | 6.3% | — | — | — | — |
| Isalchem 123AS[3] | — | — | 6.3% | — | — | — |
| Lial 123AS[4] | — | — | — | 6.3% | — | — |
| Neodol 3 AS[5] | — | — | — | — | 6.3% | — |
| Natural C12-14 AS[6] | — | — | — | — | — | 6.3% |
| Neodol C24/7 | 3.7% | 3.7% | 3.7% | 3.7% | 3.7% | 3.7% |
| HLAS | 24.9% | 24.9% | 24.9% | 24.9% | 24.9% | 24.9% |
| MEA-C12-14AE3S | 15.0% | 15.0% | 15.0% | 15.0% | 15.0% | 15.0% |
| Fatty acid | 6.3% | 6.3% | 6.3% | 6.3% | 6.3% | 6.3% |
| 1,2-propanediol | | | balance to 100% (~12%) | | | |
| glycerol | 5.0% | 5.0% | 5.0% | 5.0% | 5.0% | 5.0% |
| monoethanolamine | 8.3% | 8.3% | 8.3% | 8.3% | 8.3% | 8.3% |
| Citric-Acid | 0.7% | 0.7% | 0.7% | 0.7% | 0.7% | 0.7% |
| water | 7.1% | 7.1% | 7.1% | 7.1% | 7.1% | 7.1% |
| HEDP chelant | 2.4% | 2.4% | 2.4% | 2.4% | 2.4% | 2.4% |
| ethoxylated polyethyleneimine[7] | 1.7% | 1.7% | 1.7% | 1.7% | 1.7% | 1.7% |
| amphiphilic graft copolymer[8] | 2.6% | 2.6% | 2.6% | 2.6% | 2.6% | 2.6% |
| Hydrogenated castor oil | 0.1% | 0.1% | 0.1% | 0.1% | 0.1% | 0.1% |
| minors (perfume, dyes, antioxidant, . . . ) | 2.1% | 2.1% | 2.1% | 2.1% | 2.1% | 2.1% |
| PH | 7.4 | 7.4 | 7.4 | 7.4 | 7.4 | 7.4 |

[1]C13 AS according to invention: alkyl sulphate anionic surfactant based on C13 starting alcohol according to the invention, available from Centauri (C13-85% branched at C2 position, 15% linear, excess methyl to pentyl branching)

[2]C15 AS according to invention: alkyl sulphate anionic surfactant based on C15 starting alcohol according to the invention, available from Centauri (C13-85% branched at C2 position, 15% linear, excess methyl to pentyl branching)

[3]Isalchem 123 AS: alkyl sulphate anionic surfactant based on Isalchem 123 starting alcohol commercially available from Sasol (C12/C13:45/55-95% branched at C2 position, 5% linear, excess pentyl to methyl branching)

[4]Lial 123 AS: alkyl sulphate anionic surfactant based on Lial 123 starting alcohol commercially available from Sasol (C12/C13:45/55-55% branched at C2 position, 45% linear)

[5]Neodol 3: alkyl sulphate anionic surfactant based on Neodol 3 starting alcohol commercially available from Shell (98% C13-18% branched at C2 position, 82% linear)

[6]Natural C12-14 AS: alkyl sulphate anionic surfactant based on natural starting alcohol commercially available from P&G Chemical (C12/C14/C16% 65/30/5-100% linear)

[7]Lutensol FP620 ex BASF-$PEI_{600}$ $EO_{20}$

[8]polyethylene glycol graft polymer comprising a polyethylene glycol backbone (Pluriol E6000) and hydrophobic vinyl acetate side chains, comprising 40% by weight of the polymer system of a polyethylene glycol backbone polymer and 60% by weight of the polymer system of the grafted vinyl acetate side chains Table 2 summarizes the average liquid stringing break up time. The liquid stringing profile of the Inventive and Comparative Composition formulations was assessed by measuring the breakup time of a capillary formed upon extension of a test sample to a certain strain using a Haake Caber I extensional rheometer (Caber: capillary break-up extensional rheometer). The sample diameter was set to 6 mm, initial sample height to 3 mm, final sample height to 17.27 mm, stretch profile was set to linear and strike time set on 100 ms. The average value of 10 measurements is reported. From the results it can clearly be seen that liquid detergent compositions comprising alkyl sulphate anionic surfactants based on a starting alcohol according to the invention have a significantly lower stringing break-up time than comparative compositions comprising an alkyl sulphate anionic surfactants based on a starting alcohol outside the scope of the invention. This results in a decreased risk of liquid detergent spillage over the seal area, allowing higher line speeds in a manufacturing facility accordingly.

TABLE 2

| Liquid stringing break-up time (seconds) | |
|---|---|
| Test compositions | Caber capillary break-up time |
| Inventive Example 1 | 0.42 |
| Inventive Example 2 | 0.53 |
| Comparative Example 1 | 0.63 |
| Comparative Example 2 | 0.85 |
| Comparative Example 3 | 0.76 |
| Comparative Example 4 | 0.71 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A water-soluble unit dose article comprising a liquid laundry detergent composition and a water-soluble film;

wherein the liquid laundry detergent composition comprises a first anionic surfactant, wherein said first anionic surfactant comprises a mixture of surfactant isomers according to Formula I and surfactant isomers according to Formula II:

(I)

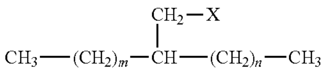

(II)

$$CH_3—(CH_2)_{m+n+3}—X$$

wherein m is between 4 and 9, and n is between 0 and 5, and wherein about 90% to about 100% by weight of the first anionic surfactant are isomers having m+n equal to 9; and wherein from about 0.001% to about 25%, by weight of the first anionic surfactant are surfactants according to Formula II; and wherein X is sulfate.

2. The water-soluble unit dose article according to claim 1, wherein the water-soluble unit dose article comprises between about 1% and about 20% by weight of the water-soluble unit dose article, of the first anionic surfactant.

3. The water-soluble unit dose article according to claim 2, wherein the water-soluble unit dose article comprises between about 2% and about 10% by weight of the water-soluble unit dose article, of the first anionic surfactant.

4. The water-soluble unit dose article according to claim 1, wherein about 15% to about 40% of the mixture of surfactant isomers of Formula I have n=1.

5. The water-soluble unit dose article according to claim 1, wherein about 60% to about 90% of the mixture of surfactant isomers of Formula I have n<3.

6. The water-soluble unit dose article according to claim 1, wherein from about 5% to about 20% by weight of the first anionic surfactant mixture are isomers of Formula I with n=2.

7. The water-soluble unit dose article according to claim 1, wherein up to about 40% of the mixture of surfactant isomers of Formula I have 5≥n>2.

8. The water-soluble unit dose article according to claim 1 wherein the water-soluble film comprises a polyvinylalcohol homopolymer or a polyvinylalcohol copolymer or a mixture thereof.

9. The water-soluble unit dose article according to claim 1, wherein the liquid laundry detergent composition comprises a further surfactant selected from a second anionic surfactant, a non-ionic surfactant or a mixture thereof.

10. The water-soluble unit dose article according to claim 9, wherein the liquid laundry detergent composition comprises a second anionic surfactant, wherein the second anionic surfactant is selected from an alkoxylated alkyl sulphate anionic surfactant, a linear alkylbenzene sulphonate, or a mixture thereof.

11. The water-soluble unit dose article according to claim 10, wherein the linear alkylbenzene sulphonate comprises $C_{10}$-$C_{16}$ alkyl benzene sulfonate, $C_{11}$-$C_{14}$ alkyl benzene sulphonate, or a mixture thereof.

12. The water-soluble unit dose article according to claim 10 wherein the liquid laundry detergent composition comprises an alkoxylated alcohol, wherein the alkoxylated alcohol is derived from a synthetical alcohol, a natural alcohol or a mixture thereof.

13. The water-soluble unit dose article according to claim 9, wherein the liquid laundry detergent composition comprises between about 20% and about 60%, by weight of the liquid laundry detergent composition of the first anionic surfactant, the second anionic surfactant and the non-ionic surfactant.

14. The water-soluble unit dose article according to claim 9, wherein the ratio of the first anionic surfactant and the second anionic surfactant to the non-ionic surfactant is from about 1:1 to about 20:1.

15. The water-soluble unit dose article according to claim 1 wherein the liquid laundry detergent composition comprises between about 1% and about 15%, by weight of the liquid laundry detergent composition of water.

16. The water-soluble unit dose article according to claim 1 wherein the liquid laundry detergent composition further comprises an amphoteric surfactant.

* * * * *